US012367856B1

(12) United States Patent
Davis et al.

(10) Patent No.: US 12,367,856 B1
(45) Date of Patent: Jul. 22, 2025

(54) HANDBELL CUSHION

(71) Applicants: Derek Lee Davis, Phoenix, AZ (US); Mareike Davis, Phoenix, AZ (US)

(72) Inventors: Derek Lee Davis, Phoenix, AZ (US); Mareike Davis, Phoenix, AZ (US)

( * ) Notice: Subject to any disclaimer, the term of this patent is extended or adjusted under 35 U.S.C. 154(b) by 548 days.

(21) Appl. No.: 17/892,952

(22) Filed: Aug. 22, 2022

Related U.S. Application Data

(60) Provisional application No. 63/236,124, filed on Aug. 23, 2021.

(51) Int. Cl.
*G10K 1/071* (2006.01)

(52) U.S. Cl.
CPC .................................... *G10K 1/071* (2013.01)

(58) Field of Classification Search
CPC ...................................................... G10K 1/071
See application file for complete search history.

(56) References Cited

U.S. PATENT DOCUMENTS 3,253,574 A * 5/1966 Malta ..................... G10K 1/071 116/171
4,121,534 A * 10/1978 Malta ....................... G10K 1/10 116/171
4,484,535 A * 11/1984 Hayward ................. G10K 1/10 116/156
4,750,402 A * 6/1988 Markey .................. G10G 7/005 984/259
5,010,798 A * 4/1991 Malta ..................... G10K 1/071 84/453
5,594,190 A * 1/1997 Malta ....................... G10G 5/00 5/655.3
5,975,008 A * 11/1999 Malta ..................... G10K 1/071 116/148
2004/0244671 A1* 12/2004 Murray .................. G10K 1/071 116/171
2013/0068082 A1* 3/2013 Mohr ........................ B05D 1/18 427/367

FOREIGN PATENT DOCUMENTS

JP 2008264421 A * 11/2008

* cited by examiner

*Primary Examiner* — Robert W Horn
(74) *Attorney, Agent, or Firm* — Rutan & Tucker, LLP; William W. Schaal

(57) ABSTRACT

A device for improving the useability of a handbell, by distributing the weight of the handbell more evenly across the player's supporting hand, thereby mitigating the discomfort of the pressure of the handbell.

8 Claims, 8 Drawing Sheets

HANDBELL CUSHION

CROSS-REFERENCE TO RELATED APPLICATIONS

This application claims the benefit of priority on U.S. Provisional Patent Application No. 63/236,124 filed Aug. 23, 2021, the entire contents of which are incorporated by reference herein.

1. FIELD

The invention relates to the field of musical instruments. More particularly, one embodiment of the invention relates to a device to protect the hands of players of handbells.

2. GENERAL BACKGROUND

Handbells, often simply referred to as bells, are musical instruments typically played in an ensemble known as a handbell choir, with each individual player responsible for playing (ringing) a limited number of bells from a larger range. Each bell rings, or vibrates, at one specific fundamental frequency corresponding to one note in the musical scale. Usually, each bell also vibrates at other associated frequencies, resulting in a fuller, more complex, sound.

A handbell choir utilizes numerous handbells, corresponding to the notes of the music to be played. For example, a 5-octave handbell choir generally utilizes 61 individual bells in the range from C3 through C8, played by approximately 13 individual bell ringers. Generally, handbell choirs range in size from 2 octaves up to 7 octaves, with the majority being 3 to 5 octaves.

Handbells may also be played by a single individual if the particular musical piece is written for solo performance. In such a case, there is often an accompanying instrument, such as a piano.

To play the bell, many different techniques may be employed, including striking the bell with a mallet as it rests on a padded table, striking the bell with a mallet as it is suspended by the handle, gently thrusting the bell into the thick foam pad of the table, etc. However, the primary method entails grasping the handle such that the player's hand forms a first around the handle with the bell casting positioned above the player's fist, handle oriented downward, mouth of the casting oriented upward. In this position, the weight of the bell is distributed by the handguard over the roughly-circular surface of the player's first as formed by the thumb and index finger.

The bell is then manipulated by the ringer to cause the clapper head at the end of the clapper shaft to swing, striking the inside of the casting and initiating vibrations thereof at the casting's characteristic resonant frequencies. Termination of the vibrations, referred to as "damping" the bell, is typically accomplished by holding the casting against the player's body or the padded table, or by grasping the casting with a free hand.

Bells not in current use usually rest on a padded table in front of the player. As the player changes bells, one is placed down on the table and another retrieved.

Frequently, bell players wear gloves. The purpose of these gloves is manifold: to protect the player's hands from the hard edges of the handle and pressure from the handguard, to provide for a more secure grip on the handle, to reduce the transfer of bodily oils and moisture to the casting, etc. As bell changes must often be executed with high frequency and precision, these gloves are typically constructed of thin, form-fitting material, rather than bulky, padded material. A disadvantage of such gloves is the tendency to overheat the ringer's hands, which is another reason for thin material.

Bells at the upper end of the frequency range are small and comparatively lightweight and can, in certain cases, be played by simultaneously holding more than one in each hand. Descending through the frequency range, the bells are of increasing size and weight. For example, bells at the lower end of a 5-octave set may typically weigh between 7 and 9 pounds, while even larger bells can weigh close to 20 pounds.

Despite the typical use of gloves described above, the weight of the larger bells can become uncomfortable, even painful, over a long practice session or performance, particularly when a specific musical piece requires quick exchange of such bells or includes an extended period of successive playing that precludes returning the bell to the table. Bass bell ringers often complain of such pain or long-term physical damage to the fingers after playing for several years.

Therefore, it is desirable to implement a device for protecting the portion of the player's hand that contacts the handguard from irritation and pain created by the weight of the handbell as transmitted by the handguard. Furthermore, the installation and removal of such a device should be both easy and quick, for useability, storage, and maintenance reasons.

SUMMARY

Embodiments of the invention relate to a device to reduce the pain and irritation experienced by a handbell ringer due to the weight of the handbell as transmitted through the handguard. The device consists of a cushion, securely attached to the handle of the bell, which protects the handbell ringer's hand from the pressure of the bell.

BRIEF DESCRIPTION OF THE DRAWINGS

The features and advantages of the present invention will become apparent from the following detailed description of the present invention in which.

DETAILED DESCRIPTION

Embodiments of the invention relate to a device for mitigating the discomfort of playing handbells, particularly the large and heavy handbells at the lower end of the frequency range, as may occur when playing for an extended period. In the following description, certain terminology is used to describe the elements of a typical handbell.

Figure 1:
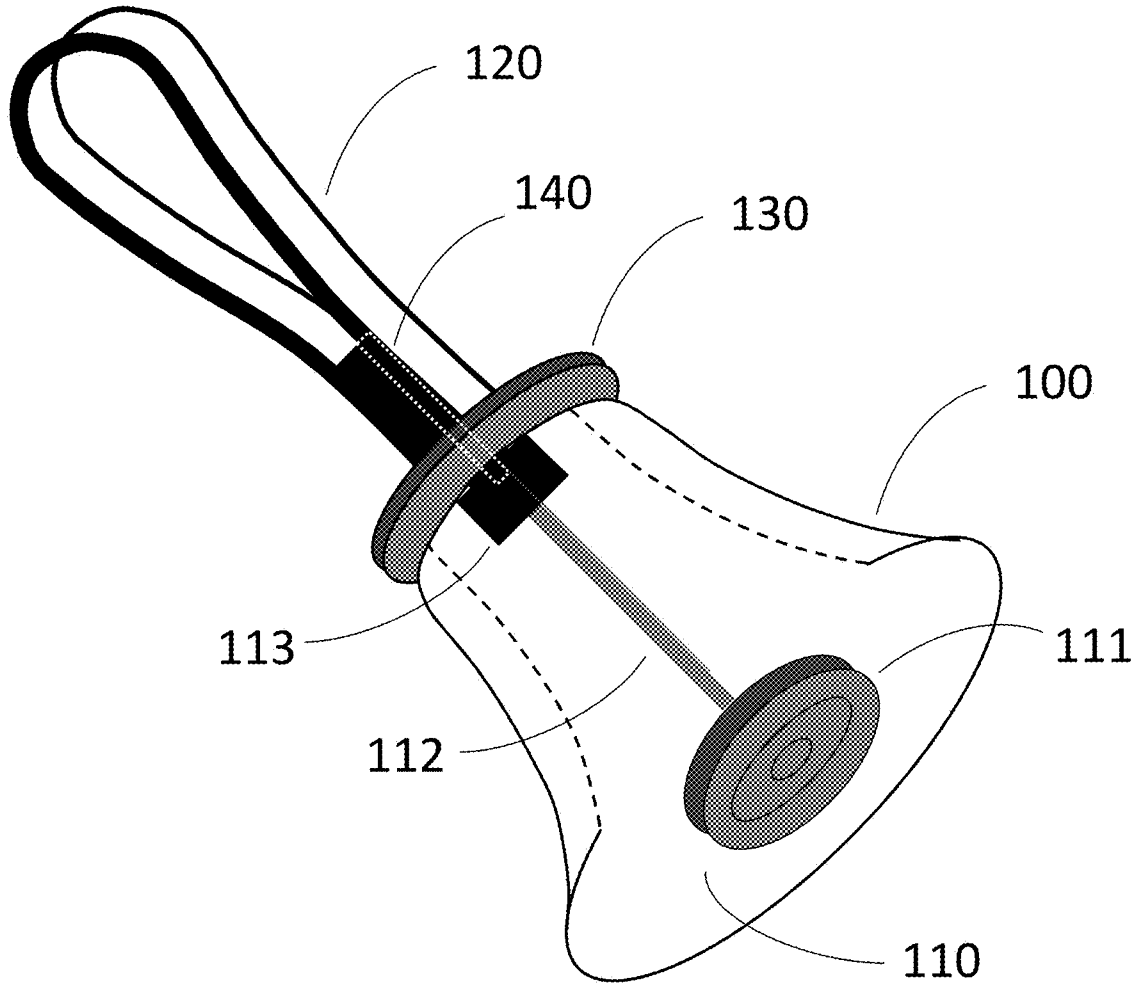
FIG. 1 is a cut-away view of a typical handbell, not employing the present invention.

Referring to the cut-away representation of a handbell in FIG. 1, which does not incorporate the present invention, a handbell typically comprises metal casting 100 (e.g., bronze or aluminum), clapper mechanism (hereinafter, "clapper") 110 mounted inside the casting 100, a handle 120 by which the player manipulates the bell, and a handguard 130 which isolates the casting 100 from the player's hand when the bell is in use. The isolation of casting 100 from the player's hand by the handguard 130 serves to allow the casting 100 to vibrate after being stuck by a portion of the clapper 110 without being damped by contact with the ringer's hand.

Clapper mechanism 110 comprises a clapper head 111, a clapper shaft 112 to which the clapper head is mounted, and a yoke 113. The yoke 113 provides a pivoting attachment point for the clapper shaft 112, allowing the clapper shaft 112 and the clapper head 111 to swing in a plane, such that the clapper head 111 may impact the inside surface of the casting 100. The yoke 113 typically also comprises a spring mechanism which prevents the clapper head 111 from inadvertently contacting the casting inappropriately.

These elements are typically secured to each other by means of a fastener 140 through the handle 120, the handguard 130, the casting 100, and the yoke 113.

Figure 2:
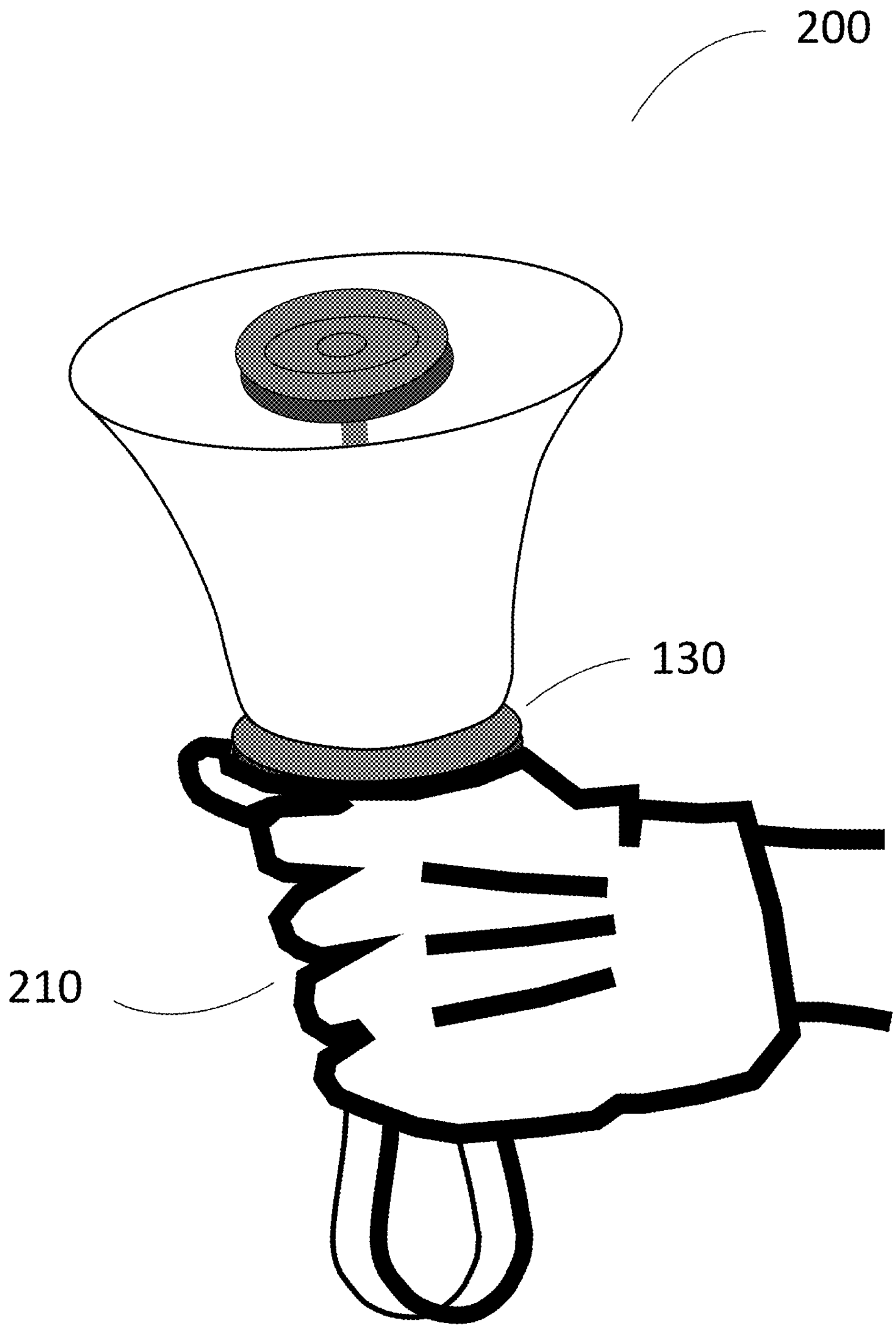
FIG. 2 is a perspective view demonstrating the typical method of holding a handbell, not employing the present invention.

Referring to FIG. 2, which does not incorporate the present invention, a handbell 200 is held in the typical ready-to-ring position in bell player's first 210. The weight of the handbell is transmitted to the index finger and thumb of first 210 by handguard 130, creating potentially painful pressure points, particularly at the joints.

The present invention, referred to hereafter as the "bell cushion," acts to more evenly distribute the weight of the handbell over the thumb and index finger, relieving these pressure points.

Figure 3:
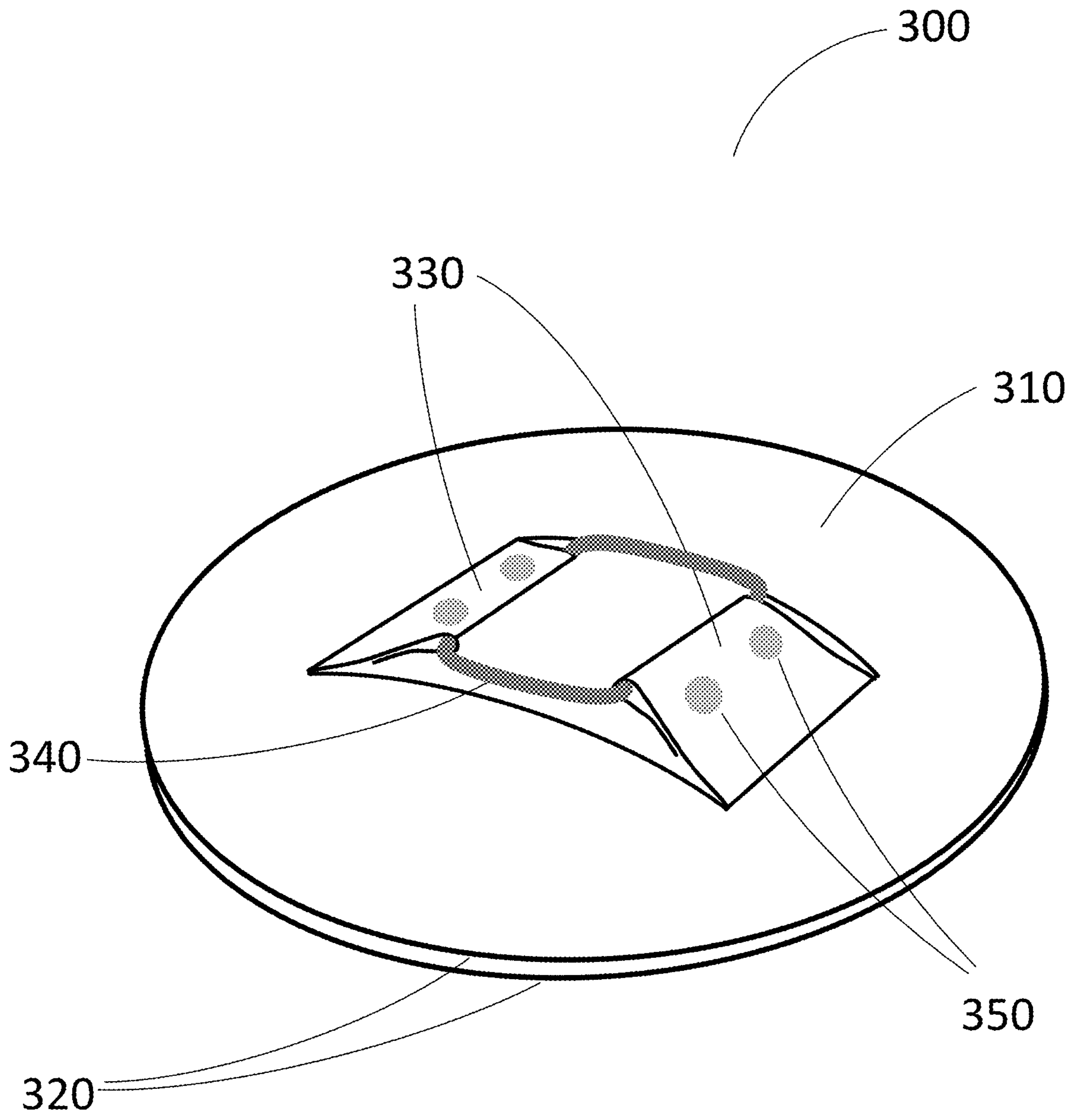
FIG. 3 is an illustrative diagram of the preferred embodiment of the present invention.

Referring to FIG. 3, an illustrative perspective view of the preferred embodiment, the bell cushion 300 may be formed from a flat pad of an elastic material (e.g., foam) 310, which may be laminated on both an upper and lower surfaces with a layer of fabric 320. Typically made of polypropylene or nylon, the layer of fabric 320 may be configured to protect the pad (elastic material) 310 associated with the bell cushion 300 from tearing and otherwise being damaged. More specifically, the pad 310 may be molded into a slightly concave shape of a diameter approximating that of the handguard 130.

According to one embodiment of the disclosure, as shown in FIG. 3, the center of the bell cushion 300 is a compressed rectangular area, which is further modified with a series of cuts to result in two "flaps" 330. These flaps 330 are folded and secured to create "loops" for the purpose of encompassing an elastic band 340. Flaps 330 secure the elastic band 340 by means of fasteners 350. Herein, according to this illustrative embodiment, as shown in FIG. 3, the fasteners 350 are shown as four rivets for illustrative purposes. These construction details are shown only for the purpose of clarity of the invention. Others skilled in the art may use other construction techniques in practicing the invention.

Figure 4:
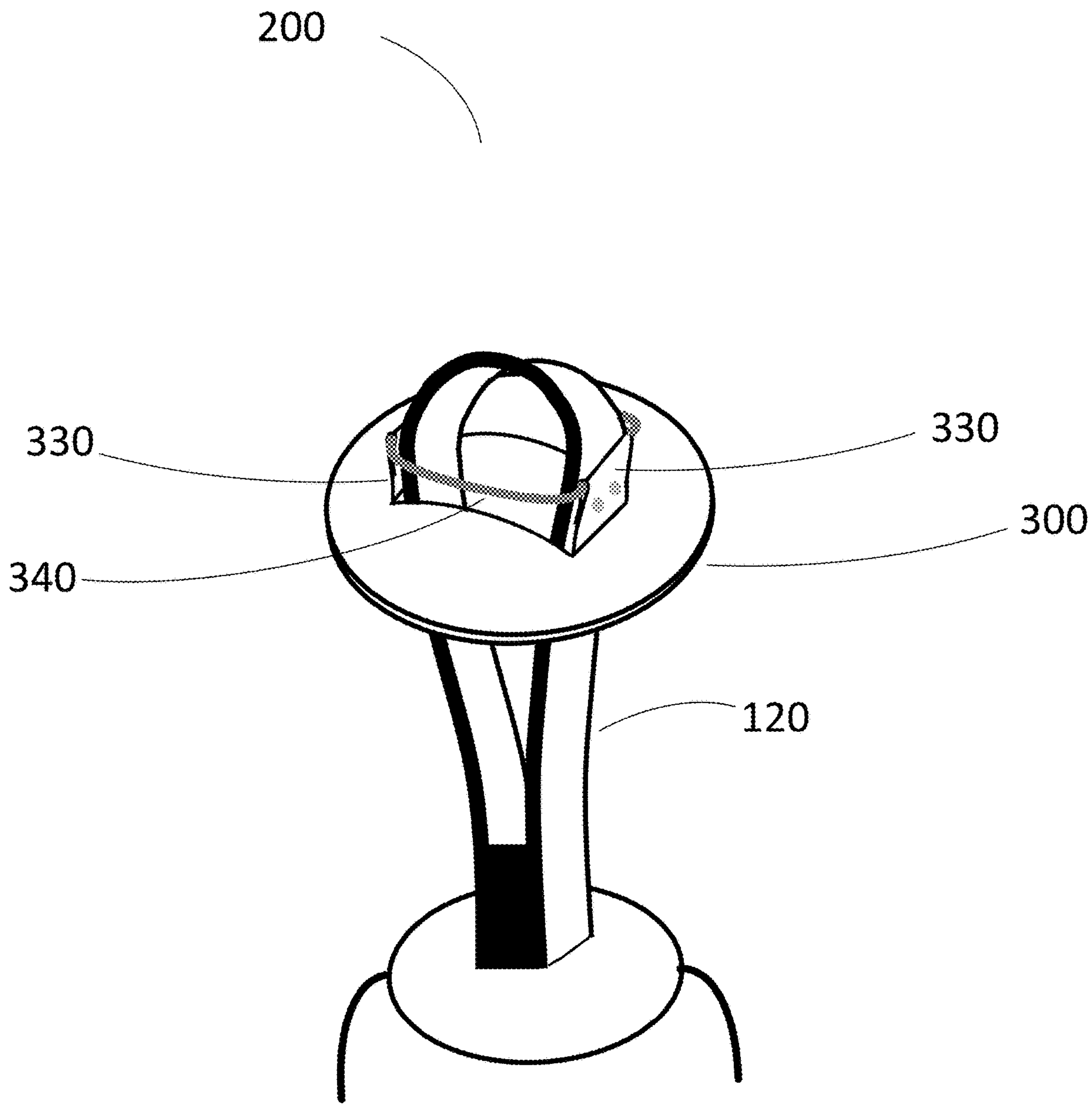
FIG. 4 is an illustrative diagram of the preferred embodiment of the present invention as shown in FIG. 3, during installation on the typical handbell of FIG. 1.

Referring to FIG. 4, during installation of the bell cushion 300 in its preferred embodiment on the bell 200, an elastic band 340 and securing flaps 330 allow bell cushion 300 to easily stretch over the widest portion of handle 120.

Figure 5:
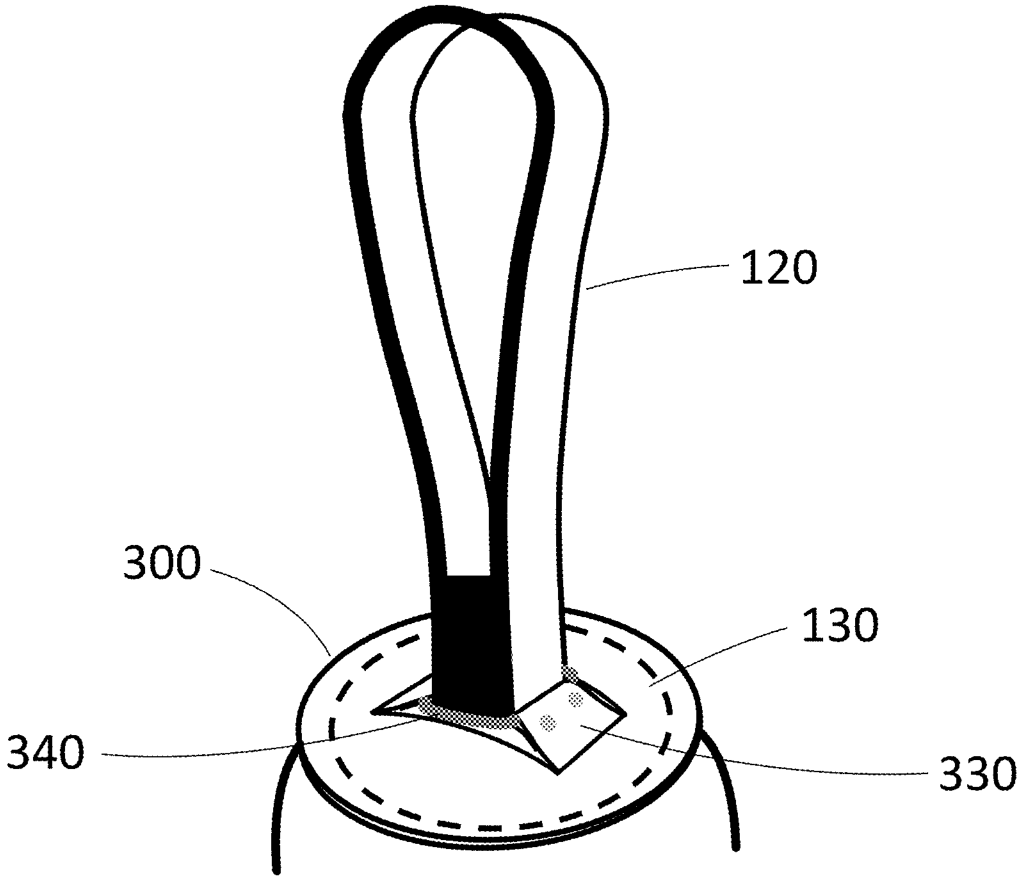
FIG. 5 is an illustrative diagram of the preferred embodiment of the present invention as shown in FIG. 3, employed with the typical handbell of FIG. 1.

Referring to FIG. 5, as the bell cushion 300 is pushed toward handguard 130, the elastic band 340 "cinches" securing flaps 330 around the narrow portion of handle 120 at the point at which the handle 120 abuts handguard 130. This method reduces stress on the pad portion of the bell cushion 300. Furthermore, it facilitates the quick installation and removal of the bell cushion 300 from the handbell. Note that the handguard 130 in this representation is obscured by the bell cushion 300.

Figure 6:
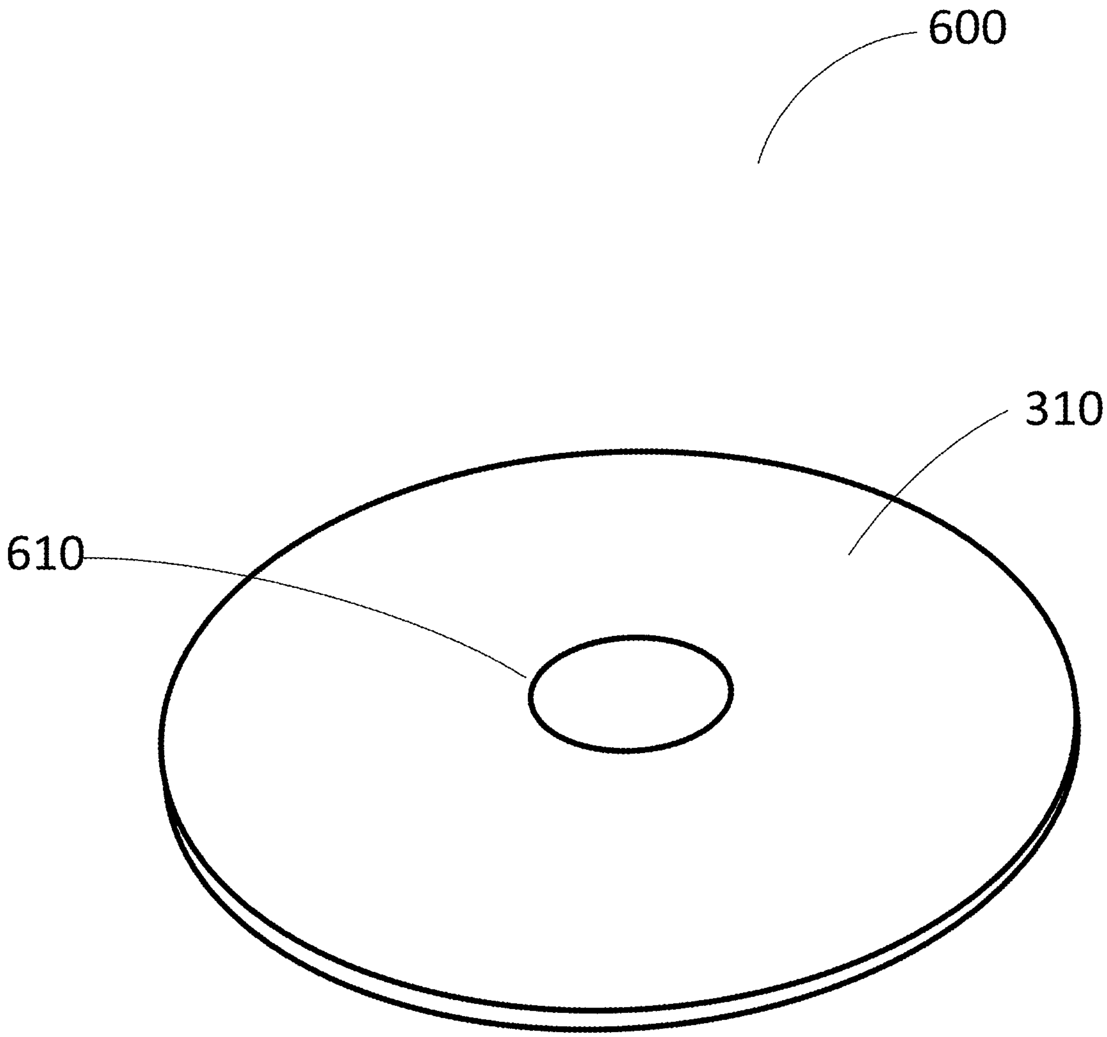
FIG. 6 is an illustrative diagram of a second embodiment of the present invention.

Referring to FIG. 6, for a second embodiment of the disclosure, a bell cushion 600 includes an aperture 610, namely an opening with a round, ellipsoidal, or rectangular shape, which is positioned at a center of the pad 310 operating as an elastic (foam) layer. This aperture 610 permits the bell cushion 600 to be slipped over the handle 120 of FIG. 5 and be positioned flush with the handguard 130 of FIG. 5. This embodiment requires a pad material capable of stretching to accommodate the widest portion of the handle 120 during installation while contracting back to firmly grip the narrowest portion of the handle at the handguard 130. The edges of the aperture 610 may be reinforced, for example with zig-zag stitching to prevent tearing or otherwise damaging of the pad 310.

Figure 7:
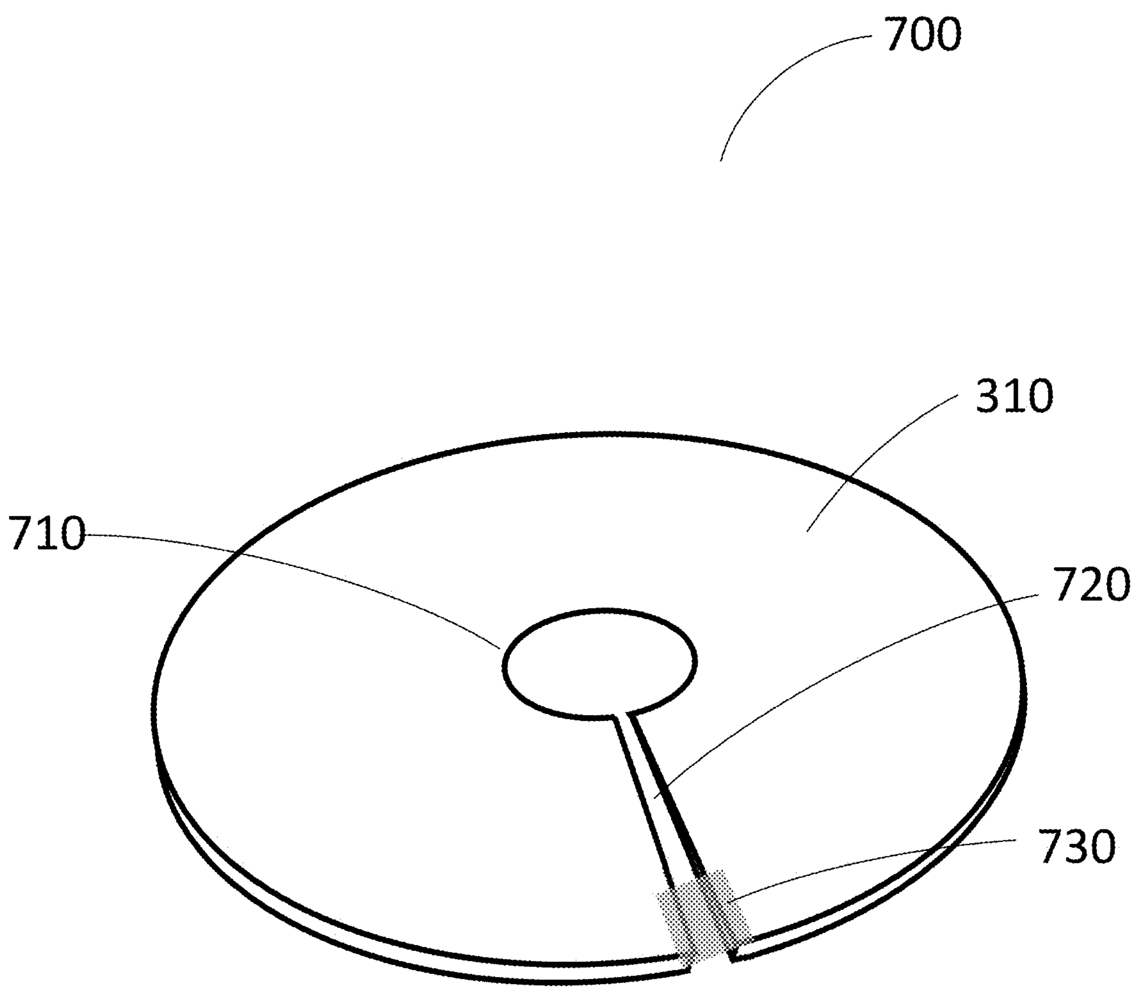
FIG. 7 is an illustrative diagram of a third embodiment of the present invention.

Referring to FIG. 7, as a third embodiment of the disclosure, the bell cushion 700 may be configured with an aperture 710, namely an opening with a round, ellipsoidal, or rectangular in shape, positioned at the center of elastic (foam) layer 310. Additionally, a radial cut 720 (exaggerated for clarity) is positioned from the center of the foam layer 310 to an outside edge, and a non-permanent fastener 730 (e.g., one or more hook/loop strips, snaps, etc.) is provided to securely connect the two sides of cut 720. This embodiment does not require stretching the elastic (foam) layer 310 over the handle 120 and therefore has the benefit of reducing stress on the pad material during installation. The edges of the aperture 710 and the radial cut 720 may be reinforced to prevent tearing or otherwise damaging of the elastic (foam) layer 310.

Figure 8:
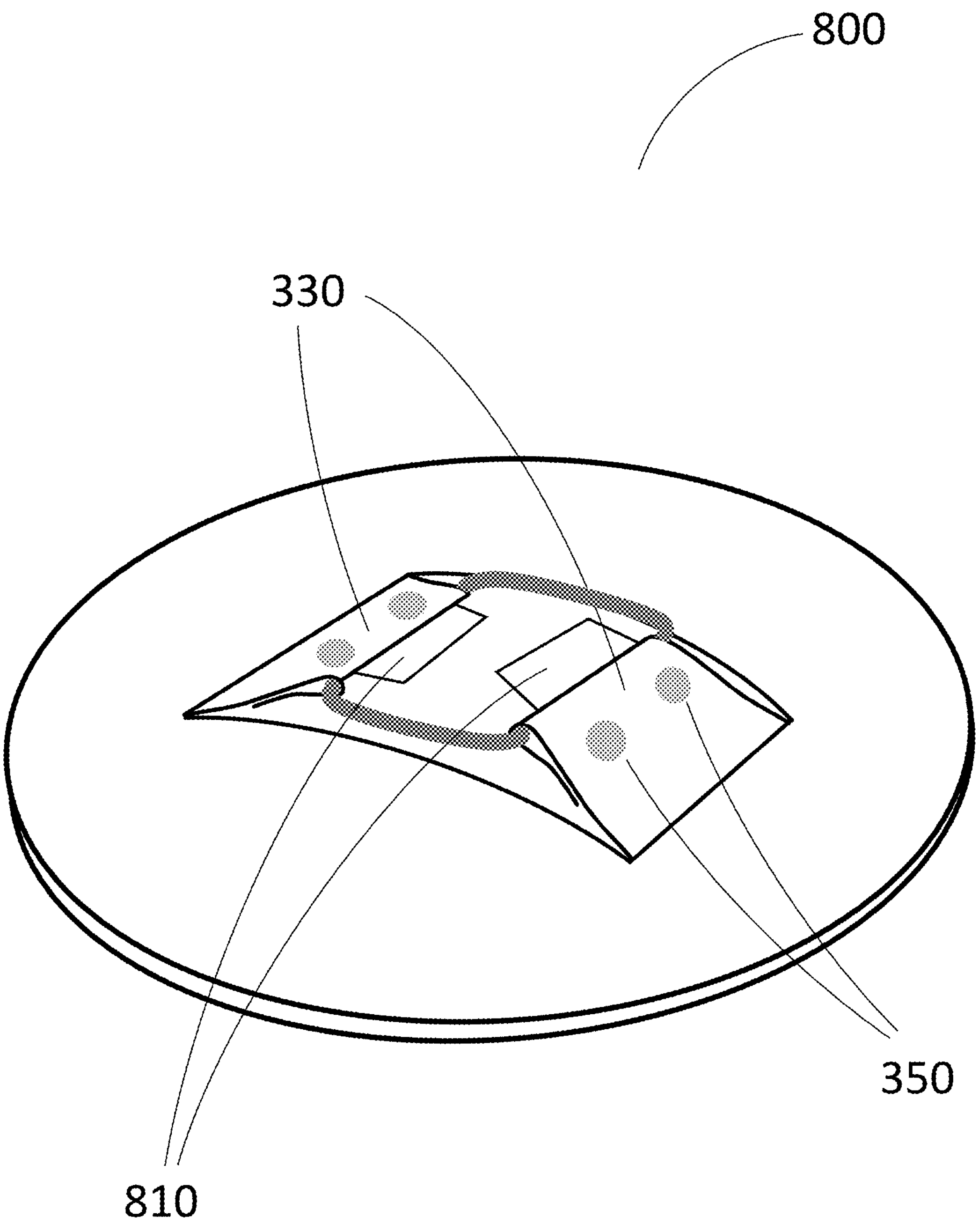
FIG. 8 is an illustrative diagram of a fourth embodiment of the present invention.

Referring to FIG. 8, as a fourth embodiment of the disclosure, similar to the bell cushion 300 of FIG. 3, a bell cushion 800 incorporates extension flaps 810 to increase the retention grip of the bell cushion 800 once installed on the handbell. Such extension flaps may be attached to the existing flaps 330, possibly utilizing the existing fasteners 350.

Another embodiment of the present invention may include the application of a rubberized coating to the underside of the bell cushion, thereby increasing the friction between the bell cushion and the handguard and decreasing the tendency of the bell cushion to rotate while in use.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A handbell cushion comprising:

a pad member having a central opening;

a pair of flap members, said flap members permanently affixed to opposite sides of said central opening;

a fastening means to form loops of said flap members;

an elastic band member, said elastic band member encompassed by said flap members.

2. The handbell cushion of claim 1, wherein said pad member is treated on the lower surface with a rubberized coating.

3. The handbell cushion of claim 1, further comprising:

a pair of flap-extension members, said flap-extension members secured to said flap members.

4. A handbell cushion comprising:

a pad member having a central opening sized for insertion over a handle of a handbell for positioning adjacent to a casting of the handbell.

5. The handbell cushion as in claim 4, wherein the edge of said central opening is reinforced with stretchable stitching.

6. The handbell cushion as in claim 4, wherein said pad member is treated on the lower surface with a rubberized coating.

7. A handbell cushion comprising:

a pad member having a central opening and a cut from said central opening to the outside periphery of said pad member;

means for non-permanently attaching the two edges of said cut.

8. The handbell cushion as in claim 7, wherein said pad member is treated on the lower surface with a rubberized coating.

* * * * *